United States Patent
Hirano et al.

(10) Patent No.: US 10,053,575 B2
(45) Date of Patent: Aug. 21, 2018

(54) BINDER RESIN COMPOSITION FOR PREFORM, BINDER PARTICLE, PREFORM, AND FIBER-REINFORCED COMPOSITE MATERIAL

(71) Applicant: Toray Industries, Inc., Tokyo (JP)

(72) Inventors: Masanori Hirano, Nagoya (JP); Nobuyuki Tomioka, Nagoya (JP); Shiro Honda, Nagoya (JP)

(73) Assignee: Toray Industries, Inc. (JP)

( * ) Notice: Subject to any disclaimer, the term of this patent is extended or adjusted under 35 U.S.C. 154(b) by 1 day.

(21) Appl. No.: 14/410,439

(22) PCT Filed: Jul. 3, 2013

(86) PCT No.: PCT/JP2013/068249
§ 371 (c)(1),
(2) Date: Dec. 22, 2014

(87) PCT Pub. No.: WO2014/007288
PCT Pub. Date: Jan. 9, 2014

(65) Prior Publication Data
US 2015/0322257 A1 Nov. 12, 2015

(30) Foreign Application Priority Data

Jul. 5, 2012 (JP) .................................. 2012-151102
Feb. 27, 2013 (JP) .................................. 2013-036672

(51) Int. Cl.
| | |
|---|---|
| *B32B 27/38* | (2006.01) |
| *C08L 63/00* | (2006.01) |
| *C08G 59/02* | (2006.01) |
| *D01F 6/96* | (2006.01) |
| *B32B 27/18* | (2006.01) |
| *B32B 27/26* | (2006.01) |
| *B32B 37/06* | (2006.01) |
| *C08J 5/24* | (2006.01) |
| *C08G 59/24* | (2006.01) |
| *C08G 59/68* | (2006.01) |

(52) U.S. Cl.
CPC .............. *C08L 63/00* (2013.01); *B32B 27/18* (2013.01); *B32B 27/26* (2013.01); *B32B 27/38* (2013.01); *B32B 37/06* (2013.01); *C08G 59/02* (2013.01); *C08G 59/245* (2013.01); *C08G 59/688* (2013.01); *C08J 5/24* (2013.01); *D01F 6/96* (2013.01); *B32B 2305/076* (2013.01); *B32B 2309/02* (2013.01); *C08G 2650/56* (2013.01); *C08J 2363/00* (2013.01); *C08L 2203/12* (2013.01); *C08L 2205/025* (2013.01); *C08L 2207/04* (2013.01); *Y10T 156/10* (2015.01); *Y10T 428/31515* (2015.04)

(58) Field of Classification Search
CPC .. C08L 63/00; C08L 2207/04; C08L 2203/12; C08L 2205/025; C08G 59/02; C08G 59/245; C08G 59/688; C08G 2650/56; D01F 6/96; B32B 27/38; B32B 27/18; B32B 37/06; B32B 2305/076; B32B 2309/02; C08J 5/24; C08J 2363/00; Y10T 156/10; Y10T 428/31515
USPC ........................................................... 428/414
See application file for complete search history.

(56) References Cited

U.S. PATENT DOCUMENTS

| | | | | |
|---|---|---|---|---|
| 2010/0285265 | A1* | 11/2010 | Shinoda ................. | B29B 11/16 428/80 |
| 2011/0097568 | A1* | 4/2011 | Kamae ............... | C08G 59/3209 428/222 |
| 2011/0139496 | A1 | 6/2011 | Nakamura | |
| 2011/0184091 | A1* | 7/2011 | Mizuki .............. | C08G 59/4238 523/428 |
| 2011/0189432 | A1* | 8/2011 | Goto ....................... | B32B 15/08 428/141 |

FOREIGN PATENT DOCUMENTS

| | | |
|---|---|---|
| JP | 8-509921 | 10/1996 |
| JP | 2001-524171 | 11/2001 |
| JP | 2005-194456 | 7/2005 |
| JP | 2007-112956 | 5/2007 |
| JP | 2010-168470 | 8/2010 |
| JP | 2011-144361 | 7/2011 |
| JP | 2012-19240 | 1/2012 |

\* cited by examiner

*Primary Examiner* — David T Karst
(74) *Attorney, Agent, or Firm* — DLA Piper LLP (US)

(57) ABSTRACT

A binder resin composition for preform production includes thermosetting resin [A], thermoplastic resin [B], and curing catalyst [C], thermosetting resin [A] containing a bifunctional epoxy resin, thermoplastic resin [B] accounting for 10 to 100 parts by mass relative to 100 parts by mass of thermosetting resin [A], and curing catalyst [C] being at least one curing catalyst selected from the group consisting of organic phosphorus compounds, imidazole, and derivatives thereof.

14 Claims, No Drawings

US 10,053,575 B2

BINDER RESIN COMPOSITION FOR PREFORM, BINDER PARTICLE, PREFORM, AND FIBER-REINFORCED COMPOSITE MATERIAL

TECHNICAL FIELD

This disclosure relates to a binder resin composition for producing preform for reinforcement fiber, and preform and fiber reinforced composite material produced therefrom.

BACKGROUND

Fiber reinforced composite materials composed of reinforcement fiber and matrix resin have been in wide use in such areas as aerospace industry, sporting goods manufacturing, and other general industries since they can be designed in a variety of forms by taking advantage of good features of reinforcement fiber and matrix resin.

The fibers that can be used as reinforcement include glass fiber, aramid fiber, carbon fiber, and boron fiber. Both thermosetting resins and thermoplastic resins may serve as matrix resin, but thermosetting resins are in wide use because they serve easily to impregnate reinforcement fiber. Useful thermosetting resins include epoxy resin, unsaturated polyester resin, vinyl ester resin, phenol resin, bismaleimide resin, and cyanate resin, which are combined with a curing agent or curing catalyst to provide a resin composition.

Various methods are available for the production of fiber reinforced composite materials, but attention is now focused on RTM (resin transfer molding), a low cost production method that uses a mold containing reinforcement fiber base material to which liquid thermosetting resin is added and cured by heating to produce fiber reinforced composite material.

In many processes of producing fiber reinforced composite material by the RTM method, reinforcement fiber base material is first processed into preform in a similar shape to the intended product and then the preform is placed in a mold followed by adding liquid thermosetting resin.

There are some known preform preparation methods including the production of three dimensional blades from reinforcement fiber and the stacking and stitching of sheets of woven fabric of reinforcement fiber. A known method with high general versatility is the use of a hot melt binder (tackifier) to stack and shape sheets of base material such as woven fabric of reinforcement fiber.

As a binder component, Japanese Unexamined Patent Publication (Kokai) No. 2005-194456 has disclosed a resin composition that can make strong contact with reinforcement fiber composed of thermoplastic resin and epoxy resin. When preparing preform by using this resin composition as a binder, it is necessary to heat the preform mold to melt the binder so that woven fabric base sheets come in strong contact with each other and cool the preform mold to solidify the binder. In this way, heating and cooling of the preform mold is a time-consuming step and accordingly, the preform preparation period cannot be shortened largely as long as the resin composition according to Japanese Unexamined Patent Publication (Kokai) No. 2005-194456 is used as a binder.

Compared to this, Published Japanese Translation of PCT International Publication JP HEI 8-509921 has disclosed a resin composition to serve as a binder. Specifically, a resin composition with curing reactivity which consists of an epoxy resin such as liquid bisphenol A type epoxy resin and a catalyst such as ethyl triphenyl phosphonium acetate is used as a binder and the binder is partially cured by heating to produce preform with high peel strength. Even in that case, however, heating and cooling of the preform mold is still necessary, failing to shorten the preform preparation period. Furthermore, Published Japanese Translation of PCT International Publication JP 2001-524171 discloses a binder resin composition in the form of a thermosetting mixture that consists of thermosetting resin and thermoplastic resin. However, although fiber reinforced composite materials produced by molding have largely improved interlayer toughness, heating and cooling of the preform mold is still necessary and it cannot serve to shorten the preform preparation period.

It could therefore be helpful to provide a binder resin composition that can fix bases quickly without heating and cooling a preform mold and also provide a reinforcement fiber base, preform, and fiber reinforced composite material produced therefrom.

SUMMARY

We thus provide:

A resin composition that contains thermosetting resin [A], thermoplastic resin [B], and curing catalyst [C], thermosetting resin [A] containing a bifunctional epoxy resin, thermoplastic resin [B] accounting for 10 to 100 parts by mass relative to 100 parts by mass of thermosetting resin [A], and curing catalyst [C] being at least one curing catalyst selected from the group consisting of organic phosphorus compounds, imidazole, and derivatives thereof.

Thermosetting resin [A] preferably contains a liquid bifunctional epoxy resin and thermoplastic resin [B] preferably contains a hydroxyl group in the backbone chain.

In 100 parts by mass of thermosetting resin [A], it is preferable that liquid bifunctional epoxy resin account for 30 to 80 parts by mass while solid bifunctional epoxy resin account for 20 to 70 parts by mass. Furthermore, thermosetting resin [A] preferably contains solid bifunctional bisphenol type epoxy resin.

Curing catalyst [C] preferably accounts for 2 to 20 parts by mass relative to 100 parts by mass of thermosetting resin [A].

The binder resin composition may contain thermosetting resin [A], having a glass transition temperature of Tg1, and characterized in that there exists a combination of a molding temperature T° C. that is in the range of 60 to 200° C. and meets formula (1) and a molding time t that is in the range of 0.5 to 120 minutes such that the glass transition temperature Tg1 can be raised to Tg2 as expressed by formula (2) by heating at the molding temperature T° C. for the molding time t.

$$Tg1 < T \leq Tg1 + 100 \quad (1)$$

$$T \leq Tg2 \leq T + 30 \quad (2)$$

In this instance, thermosetting resin [A] is preferably an epoxy resin.

The resin composition is also preferably one that contains thermosetting resin [A], thermoplastic resin [B] and curing catalyst [C]. Here, thermosetting resin [A] contains a bifunctional epoxy resin; thermoplastic resin [B] accounts for 10 to 100 parts by mass relative to 100 parts by mass of thermosetting resin [A], and curing catalyst [C] is at least one curing catalyst selected from the group consisting of organic phosphorus compounds, imidazole, and derivatives thereof.

The molding time t and the molding temperature T are preferably in the range specified by formula (3) and more preferably in the range specified by formula (4).

$$80 \leq T+0.4t \leq 190 \quad (3)$$

$$80 \leq T+0.4t \leq 130 \quad (4)$$

The binder resin composition for preform production may contain a prereaction product for thermosetting resin [A].

The binder resin composition for preform production is preferably in the form of particles.

Furthermore, the reinforcement fiber base has the binder resin composition for preform production at least on the surface thereof; the preform includes a plurality of stacked reinforcement fiber base sheets with the binder resin composition for preform production located at least between the sheets, and the fiber reinforced composite material is produced by impregnating the preform with a liquid thermosetting resin composition followed by curing.

The preform is produced by a preform production method including the steps of attaching the binder resin composition for preform production to at least the surface of raw fabric for reinforcement fiber base to prepare reinforcement fiber base sheets, stacking the reinforcement fiber base sheets, and heating them at a real molding temperature TR in the range of 60° C. to 200° C. for 0.5 to 120 minutes so that the glass transition temperature of the binder resin composition for preform production is raised from the glass transition temperature Tg1 meeting formula (5) prior to the heating to the glass transition temperature Tg2 meeting formula (6) posterior to the heating.

$$TR-100 \leq Tg1 < TR \quad (5)$$

$$TR \leq Tg2 \leq TR+30 \quad (6)$$

The binder resin composition for preform production can be cured for solidification and accordingly the base sheets can be fixed in a short period of time without the need for heating and cooling a preform mold, thus allowing preform to be produced quickly. In addition, we ensure an improved mold-releasability in the step of producing preform from the reinforcement fiber base and accordingly, the preform produced in the preform molding step can be removed from the preform mold without cooling the mold, making it possible to shorten the time period required for preform production.

DETAILED DESCRIPTION

A preferred configuration is described below.

The binder resin composition for preform production according to a first configuration is a resin composition that contains thermosetting resin [A], thermoplastic resin [B] and curing catalyst [C] characterized in that thermosetting resin [A] contains a bifunctional epoxy resin, that thermoplastic resin [B] accounts for 10 to 100 parts by mass relative to 100 parts by mass of thermosetting resin [A], and that curing catalyst [C] is at least one curing catalyst selected from the group consisting of organic phosphorus compounds, imidazole, and derivatives thereof.

The combination of thermosetting resin [A], thermoplastic resin [B], and curing catalyst [C] that contain constituent substances as specified above and have contents as specified above allows the curing reaction of thermosetting resin [A], which is caused by the heat applied in the molding step, to be completed in a short period of time and serves to produce a binder resin composition for preform production with high adhesiveness to the reinforcement fiber base sheets. Hereinafter, the term "adhesiveness", when used simply in this form, refers to the adhesiveness of the binder resin composition for preform production to the reinforcement fiber base sheets.

As the curing reaction of the thermosetting resin [A], which is contained in the binder resin composition, progresses quickly, the curing reaction of thermosetting resin [A] causes the solidification of the binder resin composition after setting the reinforcement fiber base sheets in a preform mold heated at an appropriate temperature, allowing quick removal of the preform from the mold. It should be noted that "the curing reaction of thermosetting resin [A] contained in the binder resin composition" is sometimes described simply as "the curing reaction of the binder resin composition" by omitting "thermosetting resin [A] contained in".

Here, the term "solidification" refers to the process in which the binder resin composition comes into a glass state and then loses flowability.

Thermosetting resin [A] is a resin material that undergoes a curing reaction under heat to form a crosslinked structure and examples thereof include resin compositions of epoxy resin, phenol resin, unsaturated polyester resin, vinyl ester resin, bismaleimide resin, cyanate resin, and benzoxazine resin mixed with a curing agent or a curing catalyst.

From the viewpoint of adhesiveness and handleability, thermosetting resin [A] preferably contains epoxy resin, among others, and more preferably contains epoxy resin as primary component. Here, the expression "contains epoxy resin as primary component" means that the epoxy resin accounts for 60 mass % or more, preferably 80 mass % or more, of the thermosetting resin. Epoxy resin means a compound having two or more epoxy groups in one molecule. Such epoxy resin may be one compound having an epoxy group or a mixture of a plurality of such compounds.

Specific examples of such epoxy resin include those epoxy resin compounds that contain an epoxy group as part of a glycidyl group, such as aromatic glycidyl ethers derived from a phenol compound having a plurality of hydroxyl groups, aliphatic glycidyl ethers derived from an alcohol compound having a plurality of hydroxyl groups, glycidyl amines derived from an amine compound, and glycidyl esters derived from a carboxylic acid compound having a plurality of carboxyl groups, and other epoxy resin compounds having a structure that contains an oxirane ring formed through oxidation of an unsaturated alicyclic compound such as cyclohexene.

Examples of thermosetting resin [A] include bifunctional epoxy resins, which have high adhesiveness, among other epoxy resins. A bifunctional epoxy resin is an epoxy resin that has two epoxy groups in one epoxy resin molecule. In bifunctional epoxy resin, the crosslink density does not increase excessively in a cured binder resin composition for preform production, leading to high adhesiveness.

Thermosetting resin [A] preferably contains liquid bifunctional epoxy resin, among other bifunctional epoxy resins, from the viewpoint of the curing speed and extrusion kneading properties. Liquid bifunctional epoxy resin is an epoxy resin compound that has a glass transition temperature lower than 20° C., has flowability at normal temperature, and contains two epoxy groups in one epoxy resin molecule. Here, normal temperature means 25° C. (hereinafter the same).

The glass transition temperature as referred to here is determined by differential scanning calorimetry (DSC) according to JIS K 7121 (1987). The measuring apparatuses that meet the above standard include, for example, Pyris 1 DSC (manufactured by Perkin Elmer). A binder resin composition for preform production is sampled on an aluminum sampling pan and measurements are made at a heating rate of 40° C./min in a nitrogen atmosphere. The glass transition temperature is defined as the temperature at the midpoint of the part of the DSC curve thus obtained where the baseline shifts to the endothermic side.

Thermosetting resin [A] preferably contains solid bifunctional epoxy resin from the viewpoint of the good balance among curing reactivity, life, toughness, and heat resistance, as well as flow adjustment. The solid bifunctional epoxy resin is an epoxy resin compound that has a glass transition temperature of 20° C. or higher, has no flowability at normal temperature, and contains two epoxy groups in one epoxy resin molecule. The use of solid bifunctional epoxy resin is preferred from the viewpoint of storage stability and flow adjustment and high adhesiveness can be achieved since the crosslink density does not increase excessively in a cured binder resin composition for preform production.

It is preferable that in 100 parts by mass of thermosetting resin [A], liquid bifunctional epoxy resin account for 30 to 80 parts by mass while solid bifunctional epoxy resin account for 20 to 70 parts by mass.

If the content of the liquid bifunctional epoxy resin is less than 30 parts by mass in 100 parts by mass of thermosetting resin [A], the curing reactivity may decrease, leading to insufficient mold-releasability in the preform molding step (thus, the preform mold has to be cooled to allow the removal of the preform from the mold), and the viscosity of the binder resin composition increases, possibly making it difficult to prepare a binder resin composition through extrusion kneading. Compared to this, if the content of the liquid bifunctional epoxy resin is more than 80 parts by mass in 100 parts by mass of thermosetting resin [A], the binder resin composition for preform production may have a lower glass transition temperature, possibly leading to a decrease in storage stability.

If the content of solid bifunctional epoxy resin is less than 20 parts by mass in 100 parts by mass of thermosetting resin [A], the molded resin composition will have a decreased toughness, making it difficult to achieve an adequate adhesive strength, and the resin composition will have a decreased viscosity, possibly leading to a decrease in storage stability. Compared to this, if the content of the solid bifunctional epoxy resin is more than 70 parts by mass in 100 parts by mass of thermosetting resin [A], the Tg will not be high after the molding step, and sufficiently high mold-releasability will not be achieved in the preform molding step. Furthermore, the flowability may decrease and if, for example, the binder resin composition for preform production is in the form of particles, they may not be melted sufficiently during the preform molding process, leading to decreased adhesiveness.

The solid bifunctional epoxy resin is preferably a solid bifunctional bisphenol type epoxy resin component from the viewpoint of the good balance among curing reactivity, life, toughness, and heat resistance, as well as flow adjustment. Examples of such solid bifunctional bisphenol type epoxy resin include, but not limited to, solid forms of bisphenol A type epoxy resin, bisphenol F type epoxy resin, bisphenol S type epoxy resin, bisphenol E type epoxy resin, and bisphenol Z type epoxy resin, and alkyl substitutes, halogen substitutes, and hydrogenated substances thereof. In particular, bisphenol A type epoxy resin is preferred as it has a good balance among the curing reactivity, life, toughness, and heat resistance.

From the viewpoint of increasing the heat resistance and curing speed, thermosetting resin [A] may contain polyfunctional epoxy resin in addition to bifunctional epoxy resin.

Such polyfunctional epoxy resin compounds can be roughly divided into two groups, i.e., glycidyl amine type polyfunctional epoxy resin compounds and non-glycidyl amine type polyfunctional epoxy resin compounds.

Examples of such glycidyl amine type polyfunctional epoxy resin include, for example, tetraglycidyl diaminodiphenyl methane, triglycidyl aminophenol, triglycidyl aminocresol, and tetraglycidyl xylylene diamine; structural isomers, halogen substitutes, and alkyl substitutes thereof; and hydrogenated substances thereof.

Usable commercial products of tetraglycidyl diaminodiphenyl methane include Sumiepoxy (registered trademark) ELM434 (manufactured by Sumitomo Chemical Co., Ltd.), YH434L (manufactured by Nippon Steel & Sumikin Chemical Co., Ltd.), jER (registered trademark) 604 (manufactured by Mitsubishi Chemical Corporation), and Araldite (registered trademark) MY720 and Araldite (registered trademark) MY721 (both manufactured by Huntsman Advanced Materials Gmbh).

Useful commercial products of triglycidyl aminophenols or triglycidyl aminocresol include Sumiepoxy (registered trademark) ELM100, Sumiepoxy (registered trademark) ELM120 (both manufactured by Sumitomo Chemical Co., Ltd.), Araldite (registered trademark) MY0500, Araldite (registered trademark) MY0510, and Araldite (registered trademark) MY0600 (all manufactured by Huntsman Advanced Materials Gmbh), and jER (registered trademark) 630 (manufactured by Mitsubishi Chemical Corporation).

Usable commercial products of tetraglycidyl xylylene diamines and hydrogenated compounds thereof include Tetrad (registered trademark) -X and Tetrad (registered trademark) -C (both manufactured by Mitsubishi Gas Chemical Co., Inc.)

Examples of non-glycidyl amine type polyfunctional epoxy resin include, for example, phenol novolac type epoxy resin, cresol novolac type epoxy resin, triphenyl methane type epoxy resin, tetraphenyl ethane type epoxy resin, phenol aralkyl type epoxy resin, naphthol aralkyl type epoxy resin, and dicyclopentadiene backbone-containing epoxy resin.

Usable commercial products of phenol novolac type epoxy resin include jER (registered trademark) 152 and 154 (both manufactured by Mitsubishi Chemical Corporation) and Epicron (registered trademark) N-740, N-770, and N-775 (all manufactured by DIC).

Commercial products of cresol novolac type epoxy resin include Epicron (registered trademark) N-660, N-665, N-670, N-680, and N-695 (all manufactured by DIC), EOCN-1020, and EOCN-102S (all manufactured by Nippon Kayaku Co., Ltd.), and YDCN-700 and YDCN-701 (all manufactured by Nippon Steel Chemical Co., Ltd.).

Commercial products of triphenyl methane type epoxy resin include Tactix (registered trademark) 742 (manufactured by Huntsman Advanced Materials Gmbh), and EPPN-501H and EPPN-502H (both manufactured by Nippon Kayaku Co., Ltd.)

Commercial products of tetraphenyl ethane type epoxy resin include jER (registered trademark) 1031 (manufactured by Mitsubishi Chemical Corporation) and GTR1800 (manufactured by Nippon Kayaku Co., Ltd.).

Commercial products of phenol aralkyl type epoxy resin include NC2000 series (manufactured by Nippon Kayaku Co., Ltd.), NC7000 series (manufactured by Nippon Kayaku Co., Ltd.), and NC3000 series (manufactured by Nippon Kayaku Co., Ltd.).

Commercial products of naphthol aralkyl type epoxy resin include NC7300 series (manufactured by Nippon Kayaku Co., Ltd.), ESN-165, ESN-175, ESN-185, and ESN-195 (all manufactured by Nippon Steel & Sumikin Chemical Co., Ltd.) and NC3000 (manufactured by Nippon Kayaku Co., Ltd.).

Commercial products of dicyclopentadiene backbone-containing epoxy resin include Epicron (registered trademark) NC7200 series (manufactured by DIC) and XD-1000 series (manufactured by Nippon Kayaku Co., Ltd.).

Thermoplastic resin [B] should account for 10 to 100 parts by mass relative to 100 parts by mass of thermosetting resin [A] with the aim of flow optimization during the step for molding preform from a binder resin composition for preform production and adhesive strength improvement through toughness increase.

If the content of thermoplastic resin [B] is less than 10 parts by mass relative to 100 parts by mass of thermosetting resin [A], the flow optimization during the preform molding step may not be achieved sufficiently and the cured resin may fail to have sufficient toughness, possibly leading to insufficient adhesive strength. Compared to this, if the content of the thermoplastic resin is more than 100 parts by mass relative to 100 parts by mass of thermosetting resin [A], the increase in Tg tends to be insufficient after curing and the mold-releasability may not be sufficiently high in the preform molding step, possibly leading to a decrease in flowability and making it difficult to prepare a binder resin composition through extrusion kneading.

Specific examples of thermoplastic resin [B] include polyamide, polycarbonate, polyacetal, polyphenylene oxide, polyphenylene sulfide, polyallylate, polyester, polyamide-imide, polyimide, polyetherimide, polyimide having a phenyl trimethyl indane structure, polysulfone, polyethersulfone, polyether ketone, polyether ether ketone, polyaramid, polyether nitrile, polybenzimidazole, polyurethane, urea resin, polyvinyl acetal, polyvinyl formal, polyvinyl alcohol, and phenoxy resin.

In particular, phenoxy resin and polyvinyl alcohol having a hydroxyl group in the backbone chain can be used favorably as thermoplastic resin [B]. Thermoplastic resin [B] contains a hydroxyl group in the backbone chain may serve to improve the adhesive strength to the reinforcement fiber base sheets and promote the curing of the epoxy resin, possibly leading to a shortened preform molding step.

Furthermore, the binder resin composition for preform production according to the first configuration may contain a filler component such as elastomer and particles, in addition to thermoplastic resin [B] to achieve flow optimization during the molding step and increase the adhesive strength and dimensional stability. In particular, rubber particles, organic particles, and inorganic filler soluble in epoxy resin may be added to work favorably.

The addition of curing catalyst [C] is intended to promote smooth solitary curing reaction of thermosetting resin [A] or its curing reaction through bonding to a curing agent and from the viewpoint of handleability and fast curing in the molding temperature region, at least one curing catalyst selected from the group of organic phosphorus compounds, imidazole, and derivatives thereof is used.

Specific examples of the organic phosphorus compounds include tributyl phosphine, trioctyl phosphine, tricyclohexyl phosphine, triphenyl phosphine, tribenzyl phosphine, tri-o-tolyl phosphine, tri-m-tolyl phosphine, diphenyl cyclohexyl phosphine, and 1,3-bis(diphenyl phosphino) propane.

Specific examples of imidazole and derivative thereof include imidazole, 2-ethyl imidazole, 2-undecyl imidazole, 2-heptadecyl imidazole, 1,2-dimethyl imidazole, 2-ethyl-4-methyl imidazole, 1-benzyl-2-phenyl imidazole, 1-benzyl-2-methyl imidazole, 1-cyanoethyl-2-methyl imidazole, and adducts of imidazole and an epoxy compound.

Curing catalyst [C] preferably accounts for 2 to 20 parts by mass relative to 100 parts by mass of thermosetting resin [A]. If the content of curing catalyst [C] is less than 2 parts by mass relative to 100 parts by mass of thermosetting resin [A], the curing reactivity may be low and it may be impossible to remove the preform from the mold in a short period of time. If the content of curing catalyst [C] is more than 20 parts by mass relative to 100 parts by mass of thermosetting resin [A], on the other hand, the curing reactivity may be excessively high, possibly leading to a decrease in handleability.

The binder resin composition for preform production may contain a curing agent. The curing agent is a component that bonds to the thermosetting resin and forms a three dimensional network structure to cure the resin and in the case of using epoxy resin, for example, it is a compound that has an active group reactive with the epoxy group. Curing agents can be roughly divided into amine based, phenol based, anhydride based, and mercaptan based curing agents. Specifically, amine based ones include dicyandiamide, aromatic polyamine, aliphatic amine, aminobenzoic acid esters, thiourea-containing amine, and hydrazide; phenol based ones include bisphenol, phenol novolac resin, cresol novolac resin, and polyphenol compounds; anhydride based ones include phthalic anhydride, maleic anhydride, succinic anhydride, and carboxylic anhydride; and mercaptan based ones include polymercaptan and polysulfide resin.

Furthermore, from the viewpoint of maintaining both high storage stability at and around room temperature and high curing reactivity at real molding temperatures during the molding step, it is preferable to use a temperature-latent curing catalyst or curing agent as the aforementioned curing catalyst or curing agent. There are roughly two types of temperature-latent curing catalysts and curing agents, that is, solid dispersion/thermal curing type ones which are low in solubility in epoxy resin around room temperature and reactive group blocking type ones which consist of a highly reactive functional group and a poorly reactive functional group that blocks the former. The solid dispersion type ones include aliphatic amine, aromatic amine, dihydrazide compounds, amine adducts, and 2-phenyl-4-methyl-5-hydroxymethyl imidazole while the reactivity blocking type ones include onium salts, halogenated boron-amine complexes, and vinyl ether blocked carboxylic acid.

Described next is the second configuration of the binder resin composition for preform production.

The binder resin composition for preform production according to the second configuration is a resin composition containing thermosetting resin [A], having a glass transition temperature of Tg1, and characterized in that there exists a combination of a molding time t and a molding temperature T° C. such that the glass transition temperature of the resin composition can be raised to Tg2 as expressed by formula (2) by heating it at the molding temperature T° C. that is in the range of 60 to 200° C. and meets formula (1) for the molding time t that is in the range of 0.5 to 120 minutes.

$$Tg1 < T \leq Tg1+100 \quad (1)$$

$$T \leq Tg2 \leq T+30 \quad (2)$$

In the binder resin composition for preform production according to the second configuration, thermosetting resin [A] is preferably an epoxy resin from the viewpoint of adhesiveness and handleability.

The molding temperature T according to the second configuration is assumed to represent the temperature at which the preform is to be molded or the temperature at which the binder resin composition for preform production is to be solidified through curing reaction. From the viewpoint of the curability and adhesive strength of the binder resin composition for preform production according to the present invention, the molding temperature T is 60 to 200° C., preferably 80 to 150° C., and more preferably 90 to 130° C. If it is impossible to adopt a molding temperature T in a temperature region above 60° C., it means that the temperature in the molding step for the binder resin composition for preform production has to be as low as below 60° C. and, in such a case, the resin composition is likely to be high in curing reactivity and accordingly low in handleability at normal temperature. If it is impossible to adopt a molding temperature T in a temperature region below 200° C., on the other hand, it means that the temperature in the molding step for the binder resin composition for preform production has to be as high as above 200° C., and in such a case, the product of the curing reaction of the binder resin composition for preform production will be high in crosslink density and accordingly low in adhesive strength.

It is also necessary for the molding temperature T, together with the glass transition temperature $Tg1$ of the binder resin composition for preform production, to meet Equation (1), that is, $Tg1<T\leq Tg1+100$. If the molding temperature T can be set at a temperature higher than the glass transition temperature $Tg1$ of the binder resin composition for preform production, it will be possible to perform its molding at a temperature higher than $Tg1$ so that the resin can be melted sufficiently to achieve good adhesion with the reinforcement fiber base. However, if the molding temperature T can be set only at a temperature higher by more than 100° C. than the glass transition temperature $Tg1$ of the binder resin composition for preform production, a molding step performed at a high temperature above $Tg1+100°$ C. may cause the binder resin composition for preform production to melt immediately and infiltrate into the reinforcement fiber, possibly leading to a decrease in the adhesive strength between reinforcement fiber layers. From this viewpoint, the relation represented by formula (1) is preferably $Tg1+20\leq T\leq Tg1+80$, more preferably $Tg1+30\leq T\leq Tg1+60$.

The molding time t according to the second configuration is assumed to represent the time period for which the preform is to be molded or the time period required for the binder resin composition for preform production to be hardened through curing reaction. The molding time t should be 0.5 to 120 minutes, preferably 0.5 to 30 minutes, and more preferably 0.5 to 20 minutes. If it is impossible to adopt a molding time t in a region longer than 0.5 minute, it means that the real molding time for heating in the molding step for the binder resin composition for preform production has to be as short as less than 0.5 minute, and in such a case, the binder resin composition will harden immediately after the start of heating, possibly making it difficult to shape the reinforcement fiber base completely in conformity with the shape of the preform mold. If it is impossible to adopt a molding time t in a region shorter than 120 minutes, on the other hand, it means that the real molding time for heating in the molding step has to be as long as more than 120 minutes and, in such a case, the preform formation period will be lengthy, leading to a decrease in productivity.

It is preferable for the glass transition temperature $Tg1$ of the binder resin composition for preform production according to the second configuration to be 40 to 100° C. in addition to meeting formula (1) given above. If the glass transition temperature $Tg1$ is below 40° C., the viscosity may become excessively low during the molding process to cause large flows, leading to insufficient fixation and poor storage stability. If the glass transition temperature $Tg1$ is above 100° C., on the other hand, it will be difficult to melt the resin composition, possibly leading to insufficient adhesive strength and poor storage stability.

For the binder resin composition for preform production according to the second configuration, there should exist a combination of a molding temperature T° C. as specified previously and a molding time t in the aforementioned range such that the resin composition after being heated for the molding time t at the molding temperature T° C. has a glass transition temperature $Tg2$ that meets formula (2) given above, that is, $T\leq Tg2\leq T+30$, and it is preferable that there be a combination of a molding time t and a molding temperature T that meets the formula $T+10\leq Tg2\leq T+30$. If there is not a combination of a molding time t and a molding temperature T that meets formula (2) given above, that is, $T\leq Tg2\leq T+30$, it is inevitable that the glass transition temperature $Tg2$ will be lower than the real molding temperature or the glass transition temperature $Tg2$ will be higher by 30° C. than the real molding temperature under any elaborated molding conditions. If the glass transition temperature $Tg2$ is lower than the real molding temperature, the binder resin composition for preform production may fail to solidify to a sufficient degree and the resulting preform will deform as it is removed from the mold, leading to preform with insufficient dimensional accuracy. If the glass transition temperature $Tg2$ is higher by more than 30° C. than the real molding temperature, on the other hand, the resin composition will be crosslinked to an excessively high crosslink density, failing to achieve a required adhesive strength.

The glass transition temperature $Tg2$ is preferably 100° C. to 150° C., more preferably 100° C. to 130° C., in addition to meeting formula (2). If the glass transition temperature $Tg2$ is lower than 100° C., the resin composition will not easily solidify to a sufficient degree and accordingly the preform will tend to deform as it is removed from the mold, resulting in preform with insufficient dimensional accuracy. If the glass transition temperature $Tg2$ is higher than 150° C., on the other hand, the resin composition will be crosslinked to an excessively high crosslink density, accordingly making it difficult to achieve an adequate adhesive strength.

To have higher applicability to molding, the binder resin composition for preform production according to the second configuration is preferably a resin composition that contains thermosetting resin [A], thermoplastic resin [B] and curing catalyst [C] characterized in that thermosetting resin [A] contains a bifunctional epoxy resin, that thermoplastic resin [B] accounts for 10 to 100 parts by mass relative to 100 parts by mass of thermosetting resin [A], and that curing catalyst [C] is at least one curing catalyst selected from the group consisting of organic phosphorus compounds, imidazole, and derivatives thereof, that is, the binder resin composition for preform production according to the first configuration.

For the binder resin composition designed for preform according to the second configuration, the molding time t and the molding temperature T are preferably in the range specified by formula (3) and more preferably in the range specified by formula (4). To allow the molding time t and the molding temperature T to come in the ranges as described above, it is effective to adopt a suitable curing catalyst, followed by fine adjustment by selecting other appropriate components as necessary.

$$80\leq T+0.4t\leq 190 \quad (3)$$

$$80\leq T+0.4t\leq 130 \quad (4)$$

For example, if polyfunctional epoxy resin is used with dicyandiamide as curing agent and 2,4-tolylene-bis(1,1-dimethylurea) as curing catalyst, the combination can be adjusted so that the molding time t and the molding temperature T described above meet formula (3), and if solid bifunctional epoxy resin is used with an imidazole adduct as curing catalyst, the combination can be adjusted so that the molding time t and the molding temperature T described above meet formula (4).

If the binder resin composition used can meet only those combinations of a molding time t and a molding temperature T that fall below the range represented by formula (3), that is, if the value of (T+0.4t) falls below 80, the curing reactivity will be excessively high, possibly leading to poor storage stability. If the binder resin composition used can meet only those combinations of a molding time t and a molding temperature T that are above the range represented by formula (3), that is, if the value of (T+0.4t) is above 190, the curing reactivity will be excessively low and accordingly a high molding temperature will be necessary, possibly leading to deterioration and decomposition of the binder resin composition in the preform molding step.

The binder resin composition for preform production is preferably low in curing reactivity and accordingly high in heat stability in the steps from resin composition preparation to immediately before preform molding. If curing reaction progresses in steps prior to the preform molding step, the binder resin composition for preform production may not melt to a sufficient degree in the preform molding step, possibly leading to decreased strength of adhesion between the layers of the resulting preform.

Appropriate prereaction may allow the binder resin composition for preform production to partially contain a prereaction product of the thermosetting resin to cause an increase in glass transition temperature. The expression "being subjected to prereaction" used herein means causing curing reaction to progress in part of the thermosetting resin in the binder resin composition for preform production. This is likely to lead to an improvement in the storage stability of the binder resin composition for preform production. If the prereaction acts to increase the glass transition temperature of the binder resin composition for preform production, furthermore, the flow of the resin composition caused by heating during the preform molding step can be depressed, possibly leading to an improvement in the adhesive strength and quality. The prereaction of the binder resin composition for preform production may be performed either during the resin preparation step or after dispersion over the reinforcement fiber base.

There are no specific limitations on the form of the binder resin composition, and they may be in various forms including, but not limited to, film, tape, long fiber, short fiber, spun yarn, woven fabric, knit fabric, nonwoven fabric, net, and particles. Of these, particles are particularly preferred. Hereinafter, a binder resin composition in the form of particles is sometimes referred to as binder particles.

If such particles are to be adopted, their average particle diameter is preferably 10 to 1000 μm. The average particle diameter as referred to herein is the volume average particle diameter. If the average particle diameter is less than 10 μm, it may lead to a decrease in adhesive strength and workability. If the average particle diameter is more than 1,000 μm, it may sometimes lead to undulation of the reinforcement fiber during the preform molding step. As a result, the resulting fiber reinforced composite material may be poor in machine physical properties and the particles may not be easily dissolved in the liquid heat-cured resin, possibly causing problems such as a decrease in heat resistance and chemical resistance.

The average particle diameter of the binder particles can be determined by, for example, a laser diffraction type particle size distribution analyzer.

When used, the binder resin composition for preform production is attached on reinforcement fiber or reinforcement fiber base material. Examples of such reinforcement fiber include carbon fiber, glass fiber, aramid fiber, metal fiber, and combinations thereof. In particular, carbon fiber can be used favorably because it is light and strong.

The reinforcement fiber may be in the form of short fiber, continuous fiber, combinations thereof. The use of continuous fiber is preferred to obtain fiber reinforced composite material with a high volume fraction (hereinafter abbreviated as high Vf).

Reinforcement fiber may be used in the form of strands, but it is generally preferred to use reinforcement fiber after processing it into reinforcement fiber base material in the form of mat, woven fabric, knit fabric, braid, or one-directional sheet. In particular, woven fabrics are preferred because it serves to easily obtain fiber reinforced composite material with a high Vf and it is high in handleability.

Woven fabrics used for preform preparation may be in an appropriate form selected from the group of plain weave, sateen weave, diagonal weave, and non-crimp cloth. If clear coating is adopted to allow weave texture to appear in a decorative plane, good design characteristics may be obtained by using fabrics of plain weave and diagonal weave. Having good drape properties, furthermore, fabrics of sateen weave or diagonal weave are preferred when processing them into a deep three dimensional shape.

The ratio of the net volume of reinforcement fiber to the apparent volume of woven fabric is defined as filling factor of the woven fabric. The filling factor of woven fabric is expressed as $W/(1,000 t \cdot \rho f)$ where W (in $g/m^2$) is the weight per unit surface area, t (in mm) the thickness, and $\rho f$ (in $g/cm^3$) the density of reinforcement fiber. The weight per unit surface area and thickness of woven fabric are determined according to JIS R 7602 (1995). As woven fabric with a higher filling factor serves to provide fiber reinforced composite material with a higher Vf, the filling factor of woven fabric is preferably 0.10 to 0.85, more preferably 0.40 to 0.85, and still more preferably 0.50 to 0.85.

For the fiber reinforced composite material according to the present invention to have a high specific strength or a high specific modulus, the fiber volume fraction Vf is preferably 40 to 85%, more preferably 45 to 85%. For fiber reinforced composite material obtained after injecting liquid thermosetting resin into reinforcement fiber base material and curing it, the fiber volume fraction Vf as referred to herein is defined and determined as follows according to ASTM D3171 (1999). Thus, the fiber volume fraction Vf of fiber reinforced composite material can be calculated as formula (1) given below from thickness h of the fiber reinforced composite material.

$$\text{Fiber volume fraction Vf (\%)} = (Af \times N)/(\rho f \times h)/10 \qquad (1)$$

Af: weight per $m^2$ ($g/m^2$) of a sheet of fiber base
N: number of stacked fiber base sheets (number)
$\rho f$: density ($g/cm^3$) of reinforcement fiber
h: thickness (mm) of fiber reinforced composite material (test piece)

If the weight per $m^2$ of a sheet of fiber base, Af, number of stacked fiber base sheets, N, or density of reinforcement fiber, $\rho f$, is not known, the combustion method, nitric acid decomposition method, or sulfuric acid decomposition method as defined in JIS K 7075 (1991) is used to determine the fiber volume fraction of fiber reinforced composite material. The density of reinforcement fiber to be used for this calculation is measured according to JIS R 7603 (1999).

When used, the binder resin composition for preform production is preferably attached at least to the surface of the reinforcement fiber base sheets. When attaching it to the surface, it may be attached to either side or both sides with a weight per unit surface area of 0.5 to 30 g/m$^2$, preferably 1 to 10 g/m$^2$. Shape fixation and toughness increase will not be achieved effectively if the attaching rate is less than 0.5 g/m$^2$ whereas if it is more than 30 g/m$^2$, the apparent volume of reinforcement fiber strands or reinforcement fiber base sheets will be large, leading to disadvantages such as difficulty in producing fiber reinforced composite material with a large reinforcement fiber volume fraction and difficulty in impregnation with thermosetting resin.

The preform is produced by providing reinforcement fiber base sheets with the aforementioned binder resin composition for preform production at least on the surfaces thereof, stacking them, and fixing the shape. The reinforcement fiber base sheets have the binder resin composition for preform production at least on the surface of at least either side and a plurality thereof are stacked on each other to produce a layered body having the binder resin composition for preform production at least between the stacked layers. This is then heated so that the binder resin composition is cured to achieve fixation between the base sheets, thereby fixing the shape to provide preform containing the binder resin composition for preform production at least between the stacked layers. Commonly, preform can be produced by cutting the reinforcement fiber base sheets carrying the binder resin composition to predetermined shape, stacking them on a mold, and applying appropriate degrees of heat and pressure. Available compression methods include applying pressure under a press and enclosing the preform with vacuum bag film followed by aspirating air from inside using a vacuum pump to achieve compression under atmospheric pressure.

Described in more detail below are the temperature and time for production of the preform. The preform production method includes the steps of attaching the binder resin composition for preform production according to the present invention to at least the surface of raw fabric for reinforcement fiber base to prepare reinforcement fiber base sheets, stacking the reinforcement fiber base sheets, and heating them at a real molding temperature TR of 60° C. to 200° C. for 0.5 to 120 minutes so that the glass transition temperature of the binder resin composition for preform production is raised from the glass transition temperature Tg1 that meets formula (5) prior to the heating to the glass transition temperature Tg2 that meets formula (6) posterior to the heating, thereby providing preform.

$$TR-100 \leq Tg1 < TR \quad (5)$$

$$TR \leq Tg2 \leq TR+30 \quad (6)$$

The real molding temperature TR to be used to mold preform from the binder resin composition for preform production is assumed to represent the temperature at which the preform is to be molded or the temperature at which the binder resin composition for preform production is to be solidified through curing reaction. From the viewpoint of the curability and adhesive strength of the binder resin composition for preform production according to the present invention, the real molding temperature TR is 60° C. to 200° C., preferably 80° C. to 150° C., and more preferably 90° C. to 130° C. If this real molding temperature TR is less than 60° C., the curing reaction in the preform molding step will not progress sufficiently, leading to a decreased mold-releasability and insufficient adhesive strength. If this real molding temperature TR is more than 200° C., on the other hand, the product of the curing reaction of the binder resin composition for preform production will tend to have a glass transition temperature below the real molding temperature TR, leading to a low mold-releasability. Even if the binder resin composition for preform production has a glass transition temperature equal to or higher than the real molding temperature TR, the product of the curing reaction of the resin composition will have a high crosslink density, resulting in a low adhesive strength.

The real molding temperature TR should be higher than the glass transition temperature Tg1 of the binder resin composition for preform production to meet formula (5), thereby ensuring complete melting of the resin sufficiently and its adhesion to the reinforcement fiber base sheets. However, if the real molding temperature TR is higher by more than 100° C. than the glass transition temperature Tg1 of the binder resin composition for preform production, the composition may melt immediately and penetrate into the reinforcement fiber, possibly reducing the adhesion between reinforcement fiber layers.

If the glass transition temperature Tg2 of the binder resin composition for preform production in the preform produced is lower than the real molding temperature TR, the binder resin composition for preform production may fail to solidify to a sufficient degree and the resulting preform will deform as it is removed from the mold, leading to preform with insufficient dimensional accuracy. If the glass transition temperature Tg2 is higher by more than 30° C. than the real molding temperature TR, on the other hand, the resin composition will be crosslinked to an excessively high crosslink density, failing to achieve a required adhesive strength.

The real molding time tR, i.e., the time period for which the binder resin composition for preform production according to the present invention is heated for molding into preform, should be 0.5 to 120 minutes, preferably 0.5 to 30 minutes, and more preferably 0.5 to 20 minutes. If the real molding time tR is shorter than 0.5 minutes, it will be difficult to sufficiently cure the binder resin composition for preform production, leading to a low mold-releasability. If the real molding time tR is longer than 120 minutes, on the other hand, the preform molding period will lengthen, leading to a decrease in productivity.

The preform serves to realize a high mold-releasability, high dimensional accuracy, and high adhesive strength even when the temperature is maintained substantially constant during the molding step. Here, if the temperature is maintained substantially constant during the molding step, the time for heating and cooling the preform mold can be eliminated and the total time required for the preform molding step can be largely shortened. The term "substantially constant temperature" used herein commonly means that the temperature fluctuates only within ±5° C.

Fiber reinforced composite material can be produced by impregnating the preform prepared from the binder resin composition for preform production with liquid thermosetting resin and then curing the liquid thermosetting resin. As the liquid thermosetting resin is cured, commonly the binder resin composition is also cured further.

There are no specific limitations on the preparation method for the fiber reinforced composite material, but molding methods that use two-component resin such as hand lay-up method and RTM method, are preferred. Of these, the RTM molding method is particularly preferred from the viewpoint of productivity and the degree of freedom of shape of the resulting moldings. In the RTM molding method, reinforcement fiber base sheets are placed in a mold and liquid thermosetting resin is injected for impregnation, followed by curing it to provide reinforcement fiber composite material.

The liquid thermosetting resin consists of liquid resin formed mainly of monomer components and a curing agent or curing catalyst that crosslinks the monomer components three dimensionally to form a polymer.

It is preferable for the liquid resin to be epoxy resin from the viewpoint of curing reactivity and compatibility of the binder resin composition.

Specific examples of such epoxy resin include aromatic glycidyl ethers produced from a phenol having a plurality of hydroxyl groups, aliphatic glycidyl ethers produced from an alcohol having a plurality of hydroxyl groups, glycidyl amines produced from an amine, glycidyl esters produced from a carboxylic acid having a plurality of carboxyl groups, and epoxy resins having an oxirane ring.

Suitable curing agents include aliphatic polyamine, aromatic polyamine, anhydrides, imidazole, and Lewis acid complexes, of which an appropriate one may be selected for use.

The injection of liquid thermosetting resin is followed by heat-curing. The heated-curing temperature may be the same as the mold temperature at the time of the injection of the liquid thermosetting resin. However, when curing is performed at a low temperature, a long time may be required to continue the curing until the resulting fiber reinforced composite material becomes so rigid that it is not likely to undergo significant deformation as it is removed from the mold and therefore, it is preferable for the heated-curing temperature to be higher than the mold temperature in the injection step. For example, it is preferably 60 to 180° C.

EXAMPLES

Our compositions, binder particles, preforms and materials are described in more detail below with reference to Examples.

1. Input Resin Materials

The following input resin materials were used to prepare a resin composition in each Example. In Table 1, Table 4, and Table 5, the contents of the resin compositions are expressed in parts by mass unless otherwise specified.

Epoxy Resin

YD-128 (manufactured by Nippon Steel & Sumikin Chemical Co., Ltd.): liquid bifunctional bisphenol A type epoxy resin, epoxy equivalent 189

"jER" (registered trademark) 1001 (manufactured by Mitsubishi Chemical Corporation): solid bifunctional bisphenol A type epoxy resin, epoxy equivalent 475, glass transition temperature 35° C.

"jER" (registered trademark) 1004 (manufactured by Mitsubishi Chemical Corporation): solid bifunctional bisphenol A type epoxy resin, epoxy equivalent 975, glass transition temperature 60° C.

Sumiepoxy (registered trademark) ELM434 (manufactured by Sumitomo Chemical Co., Ltd.): tetraglycidyl diaminodiphenyl methane, epoxy equivalent 120

Epicron (registered trademark) N-695 (manufactured by DIC): solid cresol novolac type epoxy resin, epoxy equivalent 214

Benzoxazine Resin

P-d type benzoxazine resin (manufactured by Shikoku Chemicals Corporation industry): solid P-d type benzoxazine resin, molecular weight 434, softening point 75° C.

Thermoplastic Resin

YP-50 (manufactured by Nippon Steel & Sumikin Chemical Co., Ltd.): phenoxy resin, weight average molecular weight 70,000, glass transition temperature 88° C.

Sumikaexcel (registered trademark) PES5003P (manufactured by Sumitomo Chemical Co., Ltd.): polyethersulfone, weight average molecular weight 47,300

Curing Agent

HF-3M (manufactured by Meiwa Plastic Industries, Ltd.): phenol novolac resin (softening point 96° C.)

jER Cure (registered trademark) DICY7 (manufactured by Mitsubishi Chemical Corporation): pulverized dicyandiamide (melting point: 210° C.)

3,3'-DAS (manufactured by Mitsui Fine Chemical, Inc.): 3,3'-diaminodiphenyl sulfone (melting point: 170° C.)

Curing Catalyst

Cureduct (registered trademark) P-0505 (manufactured by Shikoku Chemicals Corporation industry): imidazole adduct Cureduct (registered trademark) L-07N (manufactured by Shikoku Chemicals Corporation industry): preservation stabilizer component of P-0505 given above Curezol (registered trademark) 2E4MZ (manufactured by Shikoku Chemicals Corporation industry): 2-ethyl-4methyl imidazole Curezol (registered trademark) 1,2-DMZ (manufactured by Shikoku Chemicals Corporation industry): 1,2-dimethyl imidazole TPP (manufactured by KI Chemical Industry Co., Ltd.): triphenyl phosphine (melting point 80° C.)

Omicure (registered trademark) 24 (manufactured by PTI Japan Corporation): 2,4-tolylene-bis(1,1-dimethylurea)

DY9577 (manufactured by Huntsman Advanced Materials Gmbh): boron trichloride octyl amine complex 2. Preparation of Binder Resin Composition According to the list of input materials and their compounding ratios given in Table 1 and Table 4, a thermosetting resin, thermoplastic resin, curing agent, and curing catalyst were heated and stirred to ensure uniform mixing under temperature and time conditions where curing reaction was not likely to progress substantially, thereby providing a binder resin composition for preform production. For the binder resin compositions for preform production denoted by B, C, or D in Table 1, furthermore, heat treatment was performed by the procedure described later so that part of the epoxy resin in each resin composition would undergo curing reaction to provide binder resin compositions for preform production B', B'', B''', C', D', and D'' containing a prereaction product of the epoxy resin. These binder resin compositions for preform production B', B'', B''', C', D', and D'' were found to have a glass transition temperature higher than that of binder resin compositions for preform production B, C, and D measured before the heat treatment.

3. Extrusion Kneading of Binder Resin Compositions

According to the list of input materials and their compounding ratios given in Table 4, an epoxy resin, thermoplastic resin, and curing catalyst were extrusion-kneaded by a small extruder (SIKRC Kneader, manufactured by Kurimoto, Ltd.) under temperature conditions where curing reaction was not likely to progress substantially. The epoxy resin and thermoplastic resin were extrusion-kneaded first at a temperature where they were compatible with each other and then the curing catalyst was added, followed by kneading under temperature conditions where curing reaction was not likely to progress substantially. In an extrusion kneadability evaluation, binder resin compositions for which the kneader current was 6 A or less or 6 to 7 A during extrusion kneading were ranked as A or B, respectively, and others for which the current was 7 A or more and the torque increased excessively to halt the extruder was ranked as C.

4. Preparation of Cured Resin Plate

A copper spacer with a thickness of 2 mm having a 50 mm×50 mm quadrate recess was attached to the bottom face of a press and after setting the press to a predetermined real molding temperature, an epoxy resin composition was poured inside the spacer, followed by closing the press. The press was opened after a predetermined real molding time to obtain a cured resin plate.

5. Measurement of Glass Transition Temperature of Resin Composition and Cured Resin Plate Resin compositions and cured resin plates prepared by curing them at a predetermined real molding temperature were used as specimens for determining the midpoint glass transition temperatures using a differential scanning calorimeter (DSC) according to JIS K 7121 (1987). The measure equipment used was Pyris1 DSC (manufactured by Perkin Elmer). A 5 to 10 mg specimen was sampled on an aluminum sample pan and subjected to measurement in a nitrogen atmosphere at a heating rate of 40° C./min in a temperature range of −30 to 300° C. and the midpoint glass transition temperature was determined in the portion of the DSC curve where the curve showed a step-like change toward the endothermic side.

6. Preparation of Binder Particles

A binder resin composition for preform production was prepared and freeze-crushed using a screen with an opening size of 1 mm and liquid nitrogen in a hammer mill (Pulverizer, manufactured by Hosokawa Micron Corporation) to provide particles. These particles were passed through a sieve with an opening size of 212 vim to remove bulky particles, thereby providing binder particles for preform production.

7. Measurement of Average Particle Diameter of Binder Particles

A total of 500 measurements were made using a laser diffraction/scattering particle size distribution analyzer (MT3300II, manufactured by Nikkiso Co., Ltd.).

8. Preparation of Preform

The binder particles prepared above were scattered over a surface of carbon fiber woven fabric at a rate of 6 g/m$^2$ and then the surface was heated by a far-infrared heater to produce reinforcement fiber base provided with a binder resin composition. Two sheets of the reinforcement fiber base provided with a binder resin composition were stacked one on top of the other in such a manner that the particle-carrying surface of one sheet came in contact with the particle-free surface of the other and heated at an appropriate real molding temperature for an appropriate real molding time under a pressure of 50 kPa to produce preform.

9. Evaluation for Mold-Releasability of Preform

The quality of the preform thus prepared was evaluated according to the degree of deformation of the preform determined immediately after it was removed from the preform mold. A specimen with a length of 150 mm and a width of 50 mm was taken from the preform and hung in the length direction and the vertical deformation caused by its own weight was measured.

10. Evaluation for Adhesive Strength of Preform

Pieces of preform prepared at various real molding temperatures for various real molding times were subjected to test for peeling between the reinforcement fiber base sheets. The test was carried out according to JIS K 6854 (1977) using an Instron type universal tester (manufactured by Instron). A specimen with a length of 150 mm (100 mm bonded portion) and a width of 25 mm was cut out of the preform. Five specimens were subjected to the same test and the average of the measurements was adopted to represent the test results. The tension rate used was 50 mm/min.

Examples 1-4

Binder resin compositions for preform production were prepared as described above according to the list of compounding ratios given in Table 1 and their glass transition temperatures were measured. Then, using these binder resin compositions for preform production, cured resin plates were prepared under the molding conditions given in Table 2 and their glass transition temperatures were measured. Furthermore, using the binder resin compositions for preform production, binder particles having the average particle diameters given in Table 2 were prepared and then used to produce preform as described above under the molding conditions given in Table 2, followed by subjecting it to mold-releasability evaluation and adhesive strength evaluation.

In Example 1, as seen from Table 2, a binder resin composition for preform production was produced under the conditions of a real molding temperature of 65° C., which is higher by 5° C. than the glass transition temperature, and a real molding time of 120 minutes and, as result, the glass transition temperature of the resin composition increased from 60° C. to 70° C. The rise in the glass transition temperature above the real molding temperature allowed the preform to be removed from the mold. At a real molding temperature of 65° C., the degree of curing of the resin composition was lower than in other cases, but the adhesive strength was at an acceptable level.

In Examples 2 to 4, as seen from Table 2, the real molding temperature was set at 80° C., 90° C., or 110° C., allowing the glass transition temperature of the resin composition to rise from 60° C. to 90° C., 110° C., or 129° C., respectively. The rise in the glass transition temperature above the real molding temperature allowed the preform to be removed smoothly from the mold. In the adhesive strength test, the high real molding temperature acted to accelerate the curing of the binder resin composition for preform production, leading to good results. In addition, the high real molding temperature also served to shorten the required molding time. In particular, at a real molding temperature of 110° C., a high adhesive strength was realized even when the real molding time was 5 minutes.

Example 5

A binder resin composition for preform production D was prepared as described above using the compounding ratio given in Table 1 and then heated at 80° C. for 120 minutes to cause part of the epoxy resin in the resin composition to undergo the curing reaction, thereby providing a binder resin composition for preform production D' which contained a prereaction product of the epoxy resin. The resin composition D' was found to have an increased glass transition temperature of 90° C. Except for using the resin composition D' and adopting the average particle diameter and molding conditions given in Table 2, the same procedure as in Example 1 was carried out for the production of a binder resin composition for preform production and its evaluation, followed by preparation of preform and its evaluation.

As shown in Table 2, the adoption of a real molding temperature of 150° C. allowed the glass transition temperature of the resin composition to rise from 90° C. to 160° C. The rise in the glass transition temperature above the real molding temperature allowed the preform to be removed smoothly from the mold. On the other hand, the cured binder resin composition for preform production had an increased glass transition temperature of 160° C., which lead the cured resin composition to have a high crosslink density and accordingly a slightly decreased adhesive strength, though it was still at an acceptable level.

Reference Example 1

Except for adopting the molding conditions given in Table 2, the same procedure as in Example 1 was carried out for the production of a binder resin composition for preform production and its evaluation, followed by preparation of preform and its evaluation.

As shown in Table 2, heating for molding was performed at a real molding temperature 50° C., which is lower than the glass transition temperature, for 3 hours, but the resin did not melt, failing to fix reinforcement fiber base sheets.

Example 6

Except for using the compounding ratio given in Table 1 and adopting the average particle diameter and molding conditions given in Table 2, the same procedure as in Example 1 was carried out for the production of a binder resin composition for preform production and its evaluation, followed by preparation of preform and its evaluation.

As shown in Table 2, a binder resin composition for preform production having a glass transition temperature of 50° C. was molded under the conditions of a real molding temperature of 110° C. and a real molding time of 5 minutes and, as result, the glass transition temperature of the resin composition increased to 130° C. The rise in the glass transition temperature to 130° C. allowed the resulting preform to be removed smoothly from the mold. The resin composition was found to have been cured sufficiently and had a sufficient level of adhesive strength.

Example 7

A binder resin composition for preform production B was prepared as described above using the compounding ratio given in Table 1 and then heated at 90° C. for 30 minutes to cause part of the epoxy resin in the resin composition to undergo the curing reaction, thereby providing a binder resin composition for preform production B' which contained a prereaction product of the epoxy resin. The resin composition B' had an increased glass transition temperature of 90° C. Except for using the resin composition B' and adopting the average particle diameter and molding conditions given in Table 2, the same procedure as in Example 1 was carried out for the production of a binder resin composition for preform production and its evaluation, followed by preparation of preform and its evaluation.

As shown in Table 2, a binder resin composition for preform production having a glass transition temperature of 90° C. was molded under the conditions of a real molding temperature of 110° C. and a real molding time of 5 minutes and, as result, the glass transition temperature of the resin composition increased to 130° C. The rise in the glass transition temperature to 130° C. allowed the resulting preform to be removed smoothly from the mold. The resin composition was found to have been cured sufficiently and had a sufficient level of adhesive strength.

Example 8

A binder resin composition for preform production B was prepared as described above using the compounding ratio given in Table 1 and then heated at 90° C. for 60 minutes to cause part of the epoxy resin in the resin composition to undergo the curing reaction, thereby providing a binder resin composition for preform production B" which contained a prereaction product of the epoxy resin. The resin composition B" had an increased glass transition temperature of 105° C. Except for using the resin composition B" and adopting the average particle diameter and molding conditions given in Table 2, the same procedure as in Example 1 was carried out for the production of a binder resin composition for preform production and its evaluation, followed by preparation of preform and its evaluation.

As shown in Table 2, a binder resin composition for preform production having a glass transition temperature of 105° C. was molded under the conditions of a real molding temperature of 110° C. and a real molding time of 120 minutes and, as result, the glass transition temperature of the resin composition increased to 125° C. The rise in the glass transition temperature to a level 15° C. above the real molding temperature allowed the preform to be removed smoothly from the mold. On the other hand, the melting of resin did not occur easily and the bonding of reinforcement fiber base sheets did not occur sufficiently, resulting in a slightly low adhesive strength, though it was at an acceptable level.

Reference Example 2

A binder resin composition for preform production B was prepared as described above using the compounding ratio given in Table 1 and then heated at 90° C. for 90 minutes to cause part of the epoxy resin in the resin composition to undergo the curing reaction, thereby providing a binder resin composition for preform production B' which contained a prereaction product of the epoxy resin. The resin composition B' had an increased glass transition temperature of 120° C. Except for using the resin composition B'" and adopting the average particle diameter and molding conditions given in Table 2, the same procedure as in Example 1 was carried out for the production of a binder resin composition for preform production and its evaluation, followed by preparation of preform and its evaluation.

As shown in Table 2, when using a binder resin composition for preform production having a glass transition temperature of 120° C., which is higher by 10° C. than the real molding temperature, the resin did not melt sufficiently and failed to fix the reinforcement fiber base sheets. As a result, the mold-releasability and adhesive strength were at an insufficient level. Examples 9-13 and Reference example 3

Except for using the compounding ratio given in Table 1 and adopting the average particle diameter and molding conditions given in Table 3, the same procedure as in Example 1 was carried out for the production of a binder resin composition for preform production and its evaluation, followed by preparation of preform and its evaluation.

In Example 9, as seen from Table 3, even when a binder resin composition for preform production was molded at a real molding temperature of 120° C. for a real molding time of 1 minute, the glass transition temperature of the resin composition increased from 60° C. to 122° C., which is higher than the real molding temperature, and the resulting preform had an acceptable level of mold-releasability. The resin composition was found to have cured sufficiently and had a sufficient level of adhesive strength.

In Example 10, as seen from Table 3, when a binder resin composition for preform production was molded at a real molding temperature of 110° C. for a real molding time of 120 minutes, the glass transition temperature of the resin composition increased to 130° C. and the resulting preform had high mold-releasability. Adhesive strength test also gave excellent results since the real molding time was increased to cause the curing reaction to progress to a sufficient degree.

In Example 3, as seen from Table 3, when a binder resin composition for preform production was molded at a real molding temperature of 110° C. for a real molding time of 0.3 minute, the resin did not melt to a sufficient degree and accordingly the glass transition temperature of the resin composition increased to only 80° C., failing to cause curing reaction to a degree required for fixation. As a result, the resulting preform was poor in mold-releasability and adhesive strength.

In Example 11, as seen from Table 3, the molded binder resin composition for preform production had a low glass transition temperature of 90° C. but, a sufficient level of mold-releasability was obtained since it was higher than the real molding temperature of 80° C. The adhesive strength was also in the acceptable range.

In Example 12, the glass transition temperature after molding was a high 100° C., serving to accelerate the curing reaction to result in a high adhesive strength and mold-releasability.

In Example 13, as seen from Table 3, the use of a combination of polyfunctional epoxy with an amine curing agent and urea based curing catalyst resulted in a molded binder resin composition for preform production with a glass transition temperature of a high 140° C., but the curing reaction did not progress to a sufficient degree and the adhesive strength was slightly low, though it was still in the acceptable level. The mold-releasability was at high level.

Examples 14 and 15

A binder resin composition for preform production D was prepared as described above using the compounding ratio given in Table 1 and then heated at 120° C. for 60 minutes to cause part of the epoxy resin in the resin composition to undergo the curing reaction, thereby providing a binder resin composition for preform production D" which contained a prereaction product of the epoxy resin. The resin composition D" had an increased glass transition temperature of 140° C. Except for using the resin composition D" and adopting the average particle diameter and molding conditions given in Table 3, the same procedure as in Example 1 was carried out for the production of a binder resin composition for preform production and its evaluation, followed by preparation of preform and its evaluation.

In Example 14, as seen from Table 3, the real molding temperature was set to 180° C. and accordingly, the molded binder resin composition for preform production had an increased glass transition temperature of 200° C. to cause the molecules to crosslink to a high crosslink density, resulting in a low adhesive strength, though it was still in the acceptable level. The mold-releasability was at high level.

In Example 15, as seen from Table 3, the real molding temperature was set to 200° C. and accordingly, the molded binder resin composition for preform production had an increased glass transition temperature of 215° C. to cause the molecules to crosslink to a high crosslink density, resulting in a low adhesive strength, though it was still in the acceptable level. The mold-releasability was at a fair level.

Reference Example 4

Except for using the compounding ratio given in Table 1 and adopting the average particle diameter and molding conditions given in Table 3, the same procedure as in Example 1 was carried out for the production of a binder resin composition for preform production and its evaluation, followed by preparation of preform and its evaluation.

As shown in Table 3, when a binder resin composition for preform production was molded at a real molding temperature of 80° C. with the aim of producing a product with a glass transition temperature of 70° C., the molded product had a glass transition temperature of 70° C., which was lower than the real molding temperature, resulting in preform with an insufficient mold-releasability and adhesive strength.

Examples 16 and 17

A binder resin composition for preform production C was prepared as described above according to the compounding ratios given in Table 1. The binder resin composition C had a glass transition temperature of 10° C. In the same way as above, a binder resin composition for preform production C was prepared and then heated at 80° C. for 30 minutes to cause part of the epoxy resin in the resin composition to undergo the curing reaction, thereby providing a binder resin composition for preform production C' which contained a prereaction product of the epoxy resin. The resin composition C' had an increased glass transition temperature of 30° C. Except for using different resin compositions for preform production and adopting the average particle diameters and molding conditions given in Table 3, the same procedure as in Example 1 was carried out for the production of binder resin compositions for preform production and their evaluation, followed by preparation of preforms and their evaluation.

As shown in Table 3, a binder resin composition for preform production having a glass transition temperature of 10° C. or 30° C. was molded under the conditions of a real molding temperature of 110° C. and a real molding time of 5 minutes and, as result, the glass transition temperature of the resin composition increased to 130° C. in both cases. The rise in the glass transition temperature to 130° C. allowed the resulting preform to be removed smoothly from the mold. The phenoxy resin contained in the resin composition was low in flowability during the molding step, which, along with the adhesiveness of the phenoxy resin, served to realize a high adhesive strength.

Examples 18 to 20 and Comparative Examples 1 and 2

Except for adopting the compounding ratio, average particle diameter, and molding conditions given in Table 4, the same procedure as in Example 1 was carried out for the production of a binder resin composition for preform production and its evaluation, followed by preparation of preform and its evaluation.

In Examples 18 to 20, as seen from Table 4, preform was molded at a real molding temperature of 100° C. from phenoxy resin YP50 that accounted for 10 parts by mass, 60 parts by mass, or 100 parts by mass. Preform with a high mold-releasability was obtained in all cases where the real molding time was 20 minutes or shorter. As the blending quantity of the phenoxy resin increased, the adhesive strength increased, leading to a higher adhesive strength.

In Comparative example 1, as seen from Table 4, a resin composition that was free of phenoxy resin YP-50 and had a low initial Tg of 0° C. was high in flowability during the molding step and failed to develop a sufficiently high adhesive strength.

In Comparative example 2, as seen from Table 4, phenoxy resin YP-50 accounted for 120 parts by mass and molding was performed at a real molding temperature of 100° C. for a real molding time of 25 minutes, followed by curing, but the cured product had a very low Tg of 90° C., leading to a poor mold-releasability. Extrusion kneading was also difficult to perform.

Examples 21 and 22

In Example 21, as seen from Table 4, preform was molded at a real molding temperature of 120° C. using curing catalyst 2E4MZ that accounted for 2 parts by mass. Preform with a high mold-releasability was obtained from molding for a real molding time of 13 minutes.

In Example 22, as seen from Table 4, preform was molded at a real molding temperature of 85° C. using curing catalyst 1,2-DMZ that accounted for 20 parts by mass. Preform with a high mold-releasability was obtained from molding for a real molding time of 13 minutes.

Comparative Example 3

In Comparative example 3, as seen from Table 4, preform was molded at a real molding temperature of 130° C. using curing agent 3,3'-DAS and using no curing catalyst. A real molding time of 300 minutes was required to produce preform with a sufficient mold-releasability, showing a poor curing reactivity.

Example 23

In Example 23, as seen from Table 4, preform was molded at a real molding temperature of 100° C. using polyethersulfone PES5003P as thermoplastic resin. A real molding time of 30 minutes was required, and the curability was lower than in the case of using phenoxy resin as thermoplastic resin. Although a sufficient adhesive strength was obtained, furthermore, the adhesive strength achieved was lower than when using phenoxy resin, i.e., thermoplastic resin with a backbone chain that contains a hydroxyl group.

Examples 24-31

In Example 24, as seen from Table 5, preform was molded under the conditions of a real molding temperature of 100° C. and a real molding time of 12 minutes from solid bisphenol type epoxy resin jER1001 that accounted for 20 parts by mass. A high mold-releasability and adhesive strength were obtained.

In Examples 25 and 26, as seen from Table 5, preform was molded at a real molding temperature of 100° C. from solid bisphenol type epoxy resin that accounted for 30 parts by mass or 70 parts by mass. A high mold-releasability and adhesive strength were obtained in both cases.

In Examples 27, as seen from Table 5, preform was molded at a real molding temperature of 100° C. from solid bisphenol type epoxy resin that accounted for 10 parts by mass. The blending quantity of the solid bisphenol type epoxy resin was small and accordingly, the crosslink density was high, leading to a low adhesive strength, though it was in the acceptable range.

In Examples 28, as seen from Table 5, preform was molded at a real molding temperature of 100° C. from solid bisphenol type epoxy resin that accounted for 90 parts by mass. The blending quantity of the solid bisphenol type epoxy resin was large and accordingly, the glass transition temperature increased to only 100° C., but an acceptable level of mold-releasability was obtained. The extrusion-kneadability was in the acceptable range.

In Examples 29, as seen from Table 5, preform was molded at a real molding temperature of 100° C. from solid bisphenol type epoxy resin and liquid bisphenol type epoxy resin that accounted for 0 part by mass and 100 parts by mass, respectively. The crosslink density was high and accordingly, the adhesive strength was low, though acceptable results were obtained.

In Examples 30, as seen from Table 5, preform was molded at a real molding temperature of 100° C. from solid bisphenol type epoxy resin that accounted for 100 parts by mass. Tg did not increase up to the real molding temperature and accordingly, the mold-releasability was low, though it was in the acceptable range.

In Example 31, preform was molded at a real molding temperature of 65° C. using curing catalyst 1,2-DMZ that accounted for 20 parts by mass. Preform with a high mold-releasability was obtained from molding for a real molding time of 40 minutes. Tg of the cured product was 70° C. and accordingly, the adhesive strength was low, though it was in the acceptable range.

Example 32

In Example 32, preform was molded at a real molding temperature of 150° C. for a real molding time of 10 minutes from benzoxazine resin as the primary thermosetting resin component. A high mold-releasability and adhesive strength were obtained.

Example 33

In Example 33, preform was molded at a real molding temperature of 100° C. from solid cresol novolac type epoxy resin N-695. A high mold-releasability and adhesive strength were obtained from molding for a real molding time of 10 minutes.

TABLE 1

| | Components | | | A | B | C | D |
|---|---|---|---|---|---|---|---|
| Thermosetting resin | liquid bifunctional epoxy resin | bisphenol A type epoxy resin | YD128 | | | 100 | |
| | solid bifunctional | bisphenol A type | jER1001 | | | 50 | |

TABLE 1-continued

|  | Components |  | A | B | C | D |
|---|---|---|---|---|---|---|
| epoxy resin other epoxy resin | epoxy resin | jER1004 | 100 | 50 |  |  |
|  | tetraglycidyl diaminodiphenyl methane | ELM434 |  |  |  | 20 |
|  | cresol novolac type epoxy resin | N-695 |  |  |  | 80 |
| Thermoplastic resin | phenoxy resin | YP-50 |  |  | 80 |  |
| Curing agent | phenol novolac resin | HF-3M |  |  | 11 |  |
|  | dicyandiamide | DICY7 |  |  |  | 7 |
| Curing catalyst | imidazole adduct | P-0505 | 20 | 20 |  |  |
|  | preservation stabilizer component of P-0505 | L-07N | 10 | 10 |  |  |
|  | triphenyl phosphine | TPP |  |  | 10 |  |
|  | 2,4-tolylene-bis(1,1-dimethylurea) | Omicure 24 |  |  |  | 6 |

TABLE 2

|  |  | Example 1 | Example 2 | Example 3 | Example 4 | Reference example 1 | Example 6 | Example 7 | Example 8 | Reference example 2 |
|---|---|---|---|---|---|---|---|---|---|---|
| Components | | A | | | | D' | A | B | B' | B'' | B''' |
| Binder particle characteristics | average particle diameter [μm] | 120 | 120 | 120 | 120 | 130 | 120 | 130 | 110 | 110 | 110 |
|  | initial Tg (Tg1) [° C.] | 60 | 60 | 60 | 60 | 90 | 60 | 50 | 90 | 105 | 120 |
| Molding conditions | real Molding temperature [° C.] | 65 | 80 | 90 | 110 | 150 | 50 | 110 | 110 | 110 | 110 |
|  | real molding time [min] | 120 | 90 | 30 | 5 | 90 | 180 | 5 | 5 | 120 | 120 |
| Preform characteristics | Tg (Tg2) after curing [° C.] | 70 | 90 | 110 | 129 | 160 | 50 | 130 | 130 | 125 | 120 |
|  | mold-releasability [mm] | 4 | 1 | 0 | 0 | 0 | 15 | 0 | 0 | 0 | 10 |
|  | adhesive strength [N/25 mm] | 0.4 | 0.7 | 0.8 | 0.9 | 0.4 | 0 | 0.5 | 0.8 | 0.3 | 0 |

* The apostrophes ' to ''' added to alphabetical letters mean that the relevant compositions are modifications produced by heat treatment.

TABLE 3

|  |  | Example 9 | Example 10 | Reference example 3 | Example 11 | Example 12 | Example 13 | Example 14 | Example 15 | Reference example 4 | Example 16 | Example 17 |
|---|---|---|---|---|---|---|---|---|---|---|---|---|
| Components | | A | | | B | | D | D'' | D'' | B | C | C' |
| Binder particle characteristics | average particle diameter [μm] | 120 | 120 | 120 | 130 | 130 | 120 | 110 | 100 | 130 | 130 | 130 |
|  | initial Tg (Tg1) [° C.] | 60 | 60 | 60 | 50 | 50 | 65 | 140 | 140 | 50 | 10 | 30 |
| Molding conditions | real molding temperature [° C.] | 120 | 110 | 110 | 80 | 80 | 110 | 180 | 200 | 80 | 110 | 110 |
|  | real molding time [min] | 1 | 120 | 0.3 | 30 | 60 | 120 | 120 | 120 | 1 | 6 | 5 |
| Preform characteristics | Tg (Tg2) after curing [° C.] | 122 | 130 | 80 | 90 | 100 | 140 | 200 | 215 | 70 | 130 | 130 |
|  | mold-releasability [mm] | 5 | 0 | 15 | 1 | 0 | 0 | 1 | 2 | 15 | 1 | 1 |
|  | adhesive strength [N/25 mm] | 0.5 | 0.6 | 0.2 | 0.3 | 0.6 | 0.5 | 0.4 | 0.3 | 0.1 | 1.3 | 1.3 |

* The apostrophes ' to ''' added to alphabetical letters mean that the relevant compositions are modifications produced by heat treatment.

TABLE 4

| | | | | Example 18 | Example 19 | Example 20 | Comparative example 1 | Comparative example 2 | Example 21 | Example 22 | Comparative example 3 | Example 23 |
|---|---|---|---|---|---|---|---|---|---|---|---|---|
| Thermosetting resin | liquid bifunctional epoxy resin | bisphenol A type epoxy resin | YD128 | 50 | 50 | 50 | 50 | 50 | 50 | 50 | 50 | 50 |
| | solid bifunctional epoxy resin | bisphenol A type epoxy resin | jER1001 | 50 | 50 | 50 | 50 | 50 | 50 | 50 | 50 | 50 |
| | solid polyfunctional epoxy resin | cresol novolac type epoxy resin | N-695 | — | — | — | — | — | — | — | — | — |
| | P-d type benzoxazine resin | | P-d | — | — | — | — | — | — | — | — | — |
| Thermoplastic resin | phenoxy resin | | YP-50 | 10 | 60 | 100 | 0 | 120 | 60 | 60 | 60 | — |
| | polyethersulfone | | PES5003P | — | — | — | — | — | — | — | — | 60 |
| Curing agent | 3,3'-diaminodiphenyl phosphine | | 3,3'-DAS | — | — | — | — | — | — | — | 21 | — |
| Curing catalyst | 2-ethyl-4methyl imidazole | | 2E4MZ | 10 | 10 | 10 | 10 | 10 | 2 | — | — | 10 |
| | 1,2-dimethyl imidazole | | 1,2-DMZ | — | — | — | — | — | — | 20 | — | — |
| | boron trichloride octyl amine complex | | DY9577 | — | — | — | — | — | — | — | — | — |
| Binder particle characteristics | average particle diameter [μm] | | | 120 | 120 | 120 | 120 | 120 | 120 | 120 | 120 | 120 |
| | initial Tg (Tg1) [° C.] | | | 10 | 30 | 45 | 0 | 55 | 30 | 30 | 35 | 35 |
| Molding conditions | real Molding temperature [° C.] | | | 100 | 100 | 100 | 100 | 100 | 120 | 85 | 130 | 100 |
| | real molding time [min] | | | 15 | 13 | 20 | 15 | 25 | 13 | 13 | 300 | 30 |
| Preform characteristics | Tg (Tg2) after curing [° C.] | | | 120 | 110 | 100 | 130 | 90 | 120 | 85 | 130 | 110 |
| | mold-releasability [mm] | | | 0 | 0 | 2 | 1 | 10 | 2 | 3 | 1 | 1 |
| | adhesive strength [N/25 mm] | | | 0.7 | 1.1 | 1.3 | 0.2 | 1.2 | 1.1 | 0.6 | 0.8 | 0.3 |
| extrusion kneadability | | | | A | A | B | A | C | A | A | A | A |

TABLE 5

| | | | | Example 24 | Example 25 | Example 26 | Example 27 | Example 28 | Example 29 | Example 30 | Example 31 | Example 32 | Example 33 |
|---|---|---|---|---|---|---|---|---|---|---|---|---|---|
| Thermosetting resin | liquid bifunctional epoxy resin | bisphenol A type epoxy resin | YD128 | 80 | 70 | 30 | 90 | 10 | 100 | — | 100 | 20 | 50 |
| | solid bifunctional epoxy resin | bisphenol A type epoxy resin | jER1001 | 20 | 30 | 70 | 10 | 90 | — | 100 | — | — | — |
| | solid polyfunctional epoxy resin | cresol novolac type epoxy resin | N-695 | — | — | — | — | — | — | — | — | — | 50 |
| | P-d type benzoxazine resin | | P-d | — | — | — | — | — | — | — | — | 80 | — |
| Thermoplastic resin | phenoxy resin | | YP-50 | 60 | 60 | 60 | 60 | 60 | 80 | 60 | 80 | 40 | 60 |
| | polyethersulfone | | PES5003P | — | — | — | — | — | — | — | — | — | — |
| Curing agent | 3,3'-diaminodiphenyl phosphine | | 3,3'-DAS | — | — | — | — | — | — | — | — | — | — |
| Curing catalyst | 2-ethyl-4methyl imidazole | | 2E4MZ | 10 | 10 | 10 | 10 | 10 | 10 | 10 | — | — | 10 |
| | 1,2-dimethyl imidazole | | 1,2-DMZ | — | — | — | — | — | — | — | 20 | — | — |
| | boron trichloride octyl amine complex | | DY9577 | — | — | — | — | — | — | — | — | 10 | — |
| Binder particle characteristics | average particle diameter [μm] | | | 120 | 120 | 120 | 120 | 120 | 120 | 120 | 120 | 120 | 120 |
| | initial Tg (Tg1) [° C.] | | | 20 | 23 | 35 | 15 | 40 | 10 | 50 | 10 | 30 | 35 |
| Molding conditions | real molding temperature [° C.] | | | 100 | 100 | 100 | 100 | 100 | 100 | 100 | 65 | 150 | 100 |
| | real molding time [min] | | | 12 | 13 | 20 | 15 | 30 | 12 | 20 | 40 | 10 | 10 |
| Preform characteristics | Tg (Tg2) after curing [° C.] | | | 120 | 115 | 105 | 130 | 100 | 120 | 95 | 70 | 150 | 120 |
| | mold-releasability [mm] | | | 1 | 0 | 3 | 1 | 4 | 0 | 5 | 0 | 1 | 0 |
| | adhesive strength [N/25 mm] | | | 0.6 | 1 | 1.2 | 0.4 | 1.1 | 0.4 | 0.9 | 0.4 | 0.8 | 0.9 |
| Extrusion kneadability | | | | A | A | B | A | B | A | B | A | A | A |

The invention claimed is:

1. A reinforcement fiber base comprising a binder resin composition and a plurality of stacked reinforcement fiber base sheets, the binder resin composition existing at least on a surface between adjacent stacked reinforcement fiber base sheets with a weight per unit surface area of 0.5 to 30 g/m², wherein the binder resin composition comprising thermosetting resin [A], thermoplastic resin [B], and curing catalyst [C], thermosetting resin [A] consisting of an epoxy resin which includes a bifunctional epoxy resin, thermoplastic resin [B] accounting for 10 to 100 parts by mass relative to 100 parts by mass of thermosetting resin [A], and curing catalyst [C] being at least one curing catalyst selected from the group consisting of organic phosphorus compounds, imidazole, and derivatives thereof, and wherein the thermosetting resin [A] has a glass transition temperature of Tg1 and is characterized in that there exists a combination of a molding temperature T° C. that is 60 to 200° C. and meets formula (1) and a molding time t that is 0.5 to 120 minutes such that the glass transition temperature Tg1 can be raised to Tg2 as expressed by formula (2) by heating at the molding temperature T° C. for the molding time t:

$$Tg1 < T \leq Tg1+100 \qquad (1)$$

$$T \leq Tg2 \leq T+30 \qquad (2).$$

2. The reinforcement fiber base as claimed in claim 1, wherein the bifunctional epoxy resin contains liquid bifunctional epoxy resin.

3. The reinforcement fiber base as claimed in claim 1, wherein thermoplastic resin [B] has a hydroxyl group in its backbone chain.

4. The reinforcement fiber base as claimed in claim 1, wherein 100 parts by mass of thermosetting resin [A] consists of 30 to 80 parts by mass of liquid bifunctional epoxy resin and 20 to 70 parts by mass of solid bifunctional epoxy resin.

5. The reinforcement fiber base as claimed in claim 1, wherein the bifunctional epoxy resin contains solid bifunctional bisphenol epoxy resin.

6. The reinforcement fiber base as claimed in claim 1, wherein curing catalyst [C] accounts for 2 to 20 parts by mass relative to 100 parts by mass of thermosetting resin [A].

7. The reinforcement fiber base as claimed in claim 1, wherein the molding time t and the molding temperature T are specified by formula (3):

$$80 \leq T+0.4t \leq 190 \qquad (3).$$

8. The reinforcement fiber base as claimed in claim 1, wherein the molding time t and the molding temperature T are specified by formula (4):

$$80 \leq T+0.4t \leq 130 \qquad (4).$$

9. The reinforcement fiber base as claimed in claim 1, wherein the binder resin composition contains a prereaction product of thermosetting resin [A].

10. A preform comprising the reinforcement fiber base as claimed in claim 1.

11. A fiber reinforced composite material produced by impregnating a preform as claimed in claim 10 with liquid thermosetting resin and curing the liquid thermosetting resin.

12. A preform production method comprising: preparing the reinforcement fiber base as claimed in claim 1, and heating the reinforcement fiber base at a real molding temperature TR of 60° C. to 200° C. for 0.5 to 120 minutes so that the glass transition temperature of the binder resin composition is raised from the glass transition temperature Tg1 that meets formula (5) prior to the heating to the glass transition temperature Tg2 that meets formula (6) posterior to the heating, thereby providing the preform:

$$TR-100 \leq Tg1 < TR \qquad (5)$$

$$TR \leq Tg2 \leq TR+30 \qquad (6).$$

13. The reinforcement fiber base as claimed in claim 1, wherein T° C. is 90 to 130° C.

14. The reinforcement fiber base as claimed in claim 1, wherein the epoxy resin further includes phenol novolac type epoxy resin or cresol novolac type epoxy resin.

* * * * *